March 10, 1953    L. A. MINTON    2,630,578
GUIDE FOR BALL FLUSH VALVES
Filed April 12, 1949
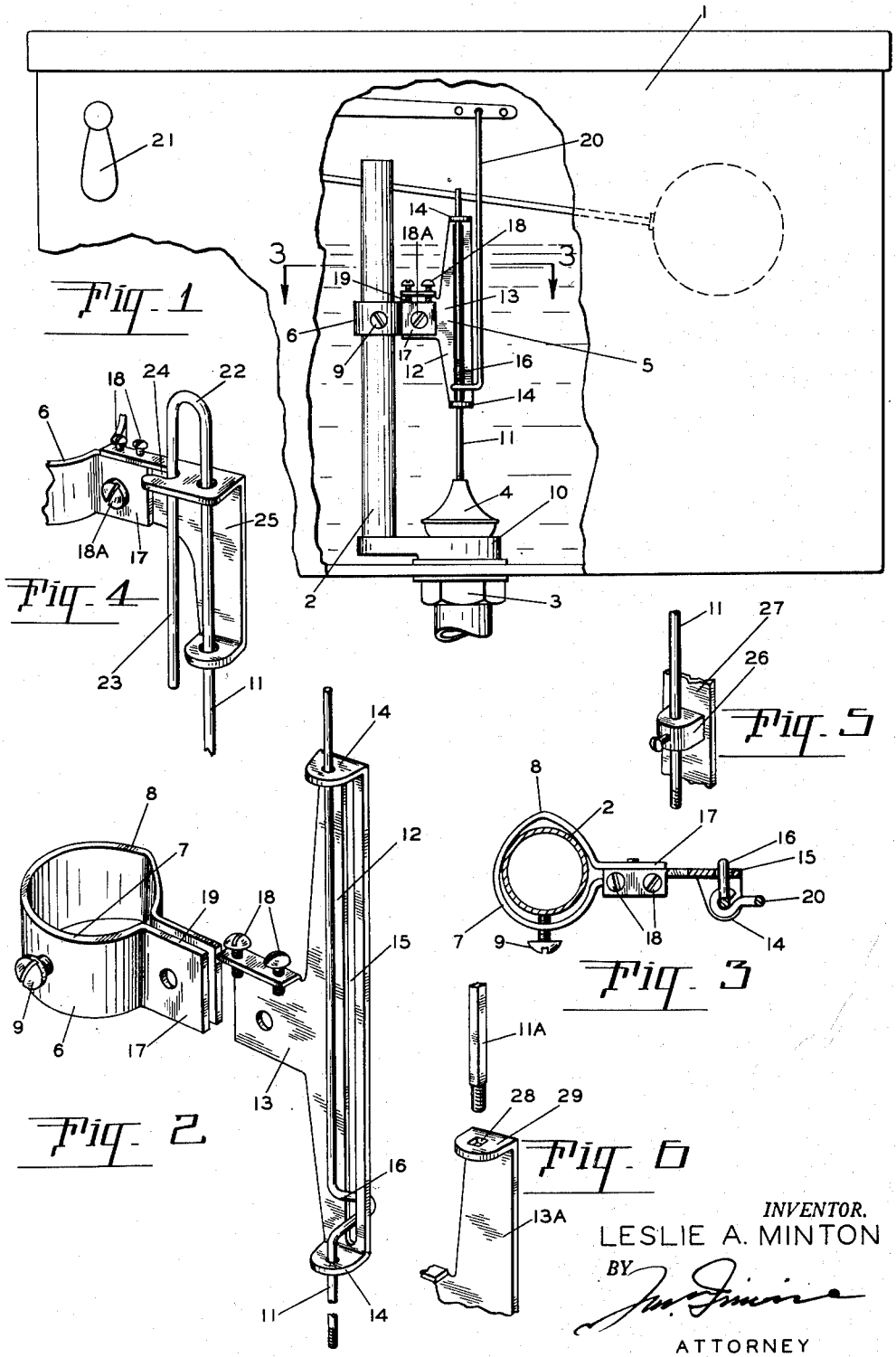
INVENTOR.
LESLIE A. MINTON
ATTORNEY Patented Mar. 10, 1953

2,630,578

UNITED STATES PATENT OFFICE 2,630,578

GUIDE FOR BALL FLUSH VALVES

Leslie A. Minton, Portland, Oreg.

Application April 12, 1949, Serial No. 86,920

6 Claims. (Cl. 4—57)

This invention relates to improvements for ball flush valves and it is particularly adapted to flush valves used in toilet tanks and is an improvement over my present pending application Serial Number 37,699, filed June 8, 1948, now Patent No. 2,549,700.

The primary object of this improvement is to prevent the ball rod from revolving within its guide, the guide forming part of my invention.

The object of preventing the ball rod from revolving is to maintain a definite seating position of the ball, as for instance if this rod should become bent, which is quite frequent, if the rod is allowed to revolve ofttimes this prevents the ball from seating properly, thereby allowing the same to leak.

Another object of my invention is the providing of a simple means within the ball rod guide for centering the ball within its seat.

A still further object in the construction of my ball rod guide is to provide means within the guide for adjusting it to all sizes of overflow pipe.

These and other incidental objects will be apparent in the drawings, specification and claims.

Referring to the drawings:

Figure 1 is a fragmentary front view of a flush tank, partially broken away with one of my new and improved ball rod guides installed therein.

Figure 2 is a perspective view of a preferred form of embodiment of my new and improved ball rod guide.

Figure 3 is a plan sectional view of the guide mounted to the overflow pipe of the flush tank, illustrating the method of connecting the trip rod thereto and the ball. This view is taken on line 3—3 of Figure 1.

Figure 4 is a fragmentary perspective view of another form of embodiment of my ball rod guide.

Figure 5 is still another fragmentary detail perspective view of a preferred form of embodiment, preventing the rotation of the rod.

Figure 6 is another method of preventing the rod from rotating, illustrated in a fragmentary perspective view.

Referring more specifically to the drawings:

The conventional flush tank is indicated by numeral 1 with the usual overflow pipe 2 and the flush pipe connection 3 associated therewith. The regular ball 4 is operated by my new and improved ball flush rod guide unit 5. This unit consists of a clamp 6 shaped as illustrated best in Figures 2 and 3. The portion 7 of the clamp being relatively round, terminating in a V-shaped portion 8, the object of which is to adapt the clamp to any sized overflow pipe, the pipe bearing into the V-portion 8 by the pressure of the locking screw 9, the V-portion centering the pipe within the clamp. This principle is best illustrated in Figure 3, wherein the clamp maintains the guide rod ball unit in a relatively centralized position over the seat 10 of the flush pipe 3.

The ball rod 11 is guided by the guide 12, consisting of a main body portion 13, having dual guides 14 forming part thereof. In order to maintain the rod 11 from rotation, which is the primary object of this invention, a slot 15 is formed in the body of the guide and is adapted to embrace the offset portion 16 of the guide rod. This prevents the said rod from rotating in its movement up and down within the guide.

The guide member 13 is adapted to clamp between the ears 17 of the clamp 6, as best illustrated in Figures 1, 2 and 3. The guide 13 carrying the valve stem can be properly adjusted to align the valve with its seat by adjusting the screw 18A and the screws 18. Obviously by releasing the screw 18A and adjusting the screws 18, the valve stem can readily be set in a vertical position and then locked in that position. These screws can be adjusted to pivot the ball rod guide member 13 about the clamping screw 18A. When the adjustment has been made the clamping screw 18A is tightened, at the same time the adjusting screws 18 are tightened maintaining the vertical axis of the ball guide rod in a definite relation to the seat 10. This is a very important feature of my invention as the adjustment of the screws 18 is very accessible and can be made easily from the top of the tank. The usual pull rod 20 is adapted to embrace the ball rod 11 underneath the offset 16 for raising the ball through the action of the operating handle 21.

I have illustrated other forms of preventing the rod 11 from rotating, as for instance Figure 4, wherein the rod 11 has a return bend 22 with the portion 23 operating within the guide slot 24 of the guide member 25.

Referring to Figure 5, I illustrate still another method of preventing the rod 11 from rotating. This consists of a cam 26 fixedly secured to the rod, then contacting the frame 27 of the guide.

In Figure 6 I illustrate still another form of device for preventing the rod 11 from rotating, and that is to provide a square rod 11A operating within square guide holes 23, formed in the dual guide portions 29 of the guide frame 13A.

One of the outstanding features of the construction of the clamp 6 is that it is reversible so that it can be adapted to the overflow pipe regardless of its position within the tank. This becomes necessary due to the fact that the guide member 13 must be maintained with the rod side facing the front of the tank.

Although certain specific embodiments of the invention have been shown and described, it is obvious that many modifications thereof are possible. The invention, therefore, is not to be restricted except in so far as is necessitated by the prior art and by the spirit of the appended claims.

What I claim is:

1. A flush valve guide comprising a clamp including a ring-like body for surrounding a vertical support and having a tapered offset portion to provide an angularly disposed seat for engaging the vertical support, a screw threaded through said body diametrically opposite said offset portion to engage and clamp the support against said offset portion, and a bracket having valve rod guides, said bracket being carried by said body substantially midway between said screw and said offset portion whereby the spacing of the bracket guides relative to the vertical support is substantially maintained despite variation of clamp position due to different sized supports.

2. A flush guide comprising a support having a laterally extending arm, a bracket having valve rod guide means, a substantially horizontal flange on said bracket to overlie said arm, an aperture in said arm and said bracket, a screw extending through said arm and bracket apertures to clamp said arm and bracket together, and a pair of screws threaded through said bracket flange on opposite sides of said aperture for engaging said arm to adjust said bracket about said clamp screw and vertically align said valve rod guide means.

3. A flush valve guide comprising a support, a bracket carried by said support, vertically spaced ears on said bracket and having aligned openings, a valve rod slidably mounted in said openings, said bracket having a slot, and a lateral bend in said valve rod and slidable in said slot to prevent rotation of said rod.

4. A guide as defined in claim 3 wherein said bracket slot is in the upper bracket ear and disposed substantially radially of the opening in said ear, and said lateral rod bend comprises a substantially U-bend in the upper end of said guide rod with the free bent end of the rod extending through said bracket slot.

5. A guide as defined in claim 3 wherein said bracket slot is vertically disposed between said ears, and said lateral rod bend comprises a substantially U-bend intermediately in said rod and extending laterally of said rod into said slot.

6. A flush valve guide comprising a clamp including a ring-like body for surrounding a vertical support and having a tapered offset portion to provide an angularly disposed seat for engaging the vertical support, a screw threaded through said body diametrically opposite said offset portion to engage and clamp the support against said offset portion, a pair of horizontally spaced ears carried by said body substantially midway between said screw and offset portion, said ears extending substantially radially of said body and each having a horizontal aperture therethrough, a bracket vertically interposed between said spaced ears and having a horizontal aperture and a substantially horizontal flange above said aperture, a clamp element extending through said ear and bracket apertures to clamp said ears and bracket together with said horizontal flange overlying one of said ears, vertically spaced guides on said bracket and having aligned openings for slidably receiving a valve rod, a pair of screws threaded through said horizontal bracket flange on opposite sides of said bracket aperture for engaging said one ear to adjust said bracket about said clamp element and vertically align said valve rod openings and a guide slot in said bracket for slidably receiving a portion of the valve rod to prevent rotation of the rod.

LESLIE A. MINTON.

REFERENCES CITED

The following references are of record in the file of this patent:

UNITED STATES PATENTS

| Number | Name | Date |
|---|---|---|
| 252,536 | Stahl | Jan. 17, 1882 |
| 904,228 | Richardson | Nov. 17, 1908 |
| 1,729,546 | Myers | Sept. 24, 1929 |
| 1,832,714 | LeTarte | Nov. 17, 1931 |
| 1,991,907 | Platt | Feb. 19, 1935 |
| 2,016,840 | Schubert | Oct. 8, 1935 |
| 2,083,955 | Lancellotte | June 15, 1937 |
| 2,450,609 | Phelps | Oct. 5, 1948 |
| 2,494,655 | Green | Jan. 17, 1950 |
| 2,502,086 | Gertz | Mar. 28, 1950 |
| 2,508,667 | Fulton | May 23, 1950 |
| 2,546,766 | McWilliams | Mar. 27, 1951 |
| 2,549,700 | Minton | Apr. 17, 1951 |